July 3, 1962   J. I. MORGAN   3,042,457
BRAKE CYLINDER RELEASE VALVE
Filed Jan. 9, 1961   4 Sheets-Sheet 1

INVENTOR.
James I. Morgan
BY John W. Michael
Attorney

July 3, 1962   J. I. MORGAN   3,042,457
BRAKE CYLINDER RELEASE VALVE
Filed Jan. 9, 1961   4 Sheets-Sheet 2

INVENTOR.
James I. Morgan
BY John W. Michael
Attorney

July 3, 1962
J. I. MORGAN
3,042,457
BRAKE CYLINDER RELEASE VALVE
Filed Jan. 9, 1961
4 Sheets-Sheet 3
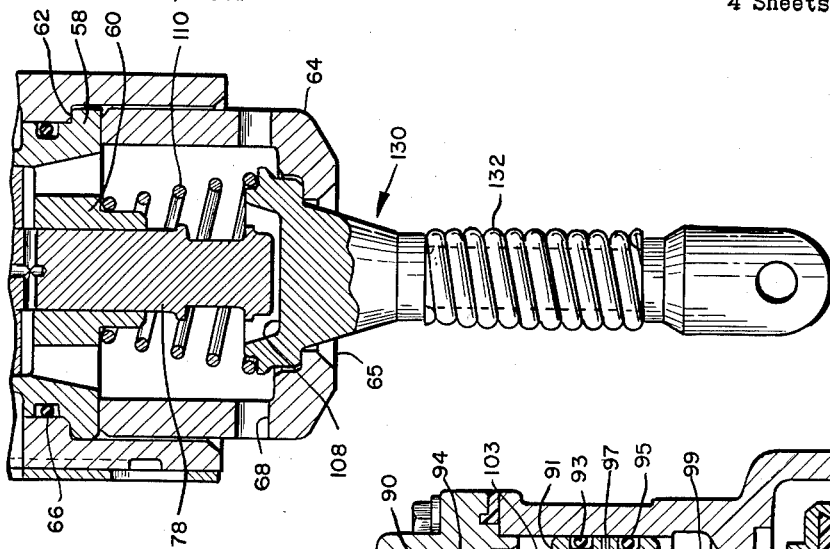
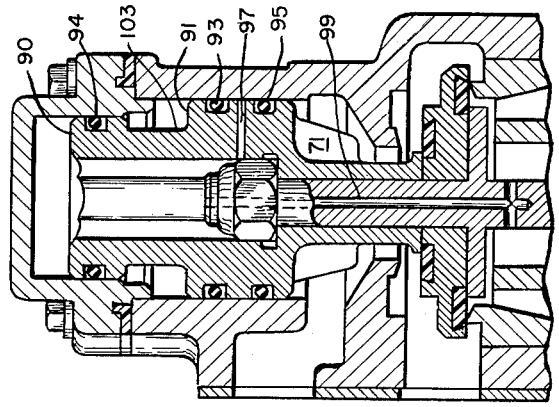
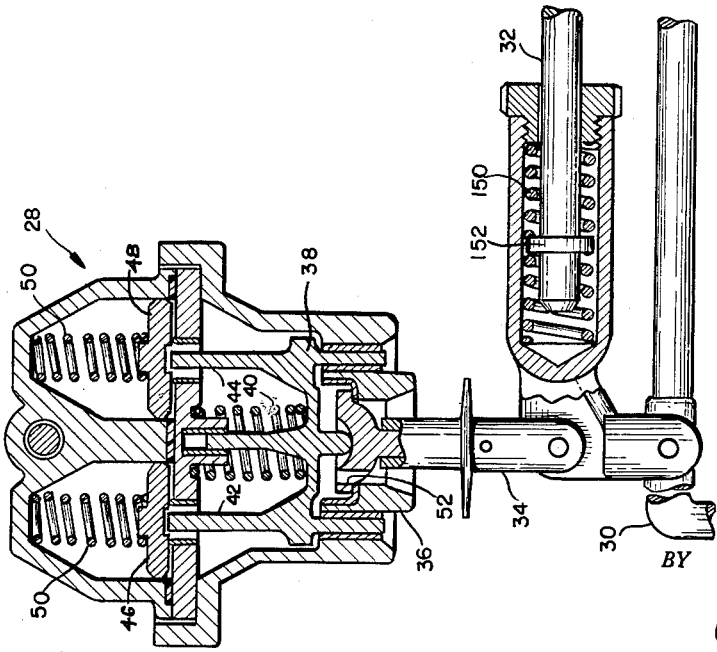
INVENTOR.
James I. Morgan
BY
John W. Michael
Attorney July 3, 1962 J. I. MORGAN 3,042,457
BRAKE CYLINDER RELEASE VALVE
Filed Jan. 9, 1961 4 Sheets-Sheet 4

INVENTOR.
James I. Morgan
BY
John W. Michael
Attorney 3,042,457
BRAKE CYLINDER RELEASE VALVE
James I. Morgan, Hales Corners, Wis., assignor to The Prime Manufacturing Co., Milwaukee, Wis., a corporation of Wisconsin
Filed Jan. 9, 1961, Ser. No. 81,315
17 Claims. (Cl. 303—69)

This invention relates to brake cylinder release valves and particularly to a valve for releasing the brakes on railroad cars while maintaining the pressure in the reservoir system.

In general, there is on each railroad car an auxiliary reservoir and an emergency reservoir for compressed air, at least one brake cylinder, and an AB valve which controls brake application. The engine supplies air under pressure through the brake pipe to fill the auxiliary reservoir on each car in the train with a predetermined pressure. Until this has been done, the train cannot be properly operated. After each reservoir has been filled, control of pressure in the brake pipe actuates the AB valve to control the brakes.

The AB valve is actuated by dropping the pressure in the brake pipe to admit air from the reservoir to the brake cylinders and set the brakes. If the train has been stopped and is to be broken up, the pressure in the cylinders must be relieved. This has been done in the past by connecting a release valve in the line between the AB valve and the brake cylinders to bleed off the pressure from the brake cylinders. The car can then be removed from the train. Where the pressure of the reservoir is bled off in order to relieve the brake cylinder, considerable time is lost in recharging the reservoirs after the car has been assembled in a train.

The primary object of this invention is to provide an improved brake cylinder relief valve to reduce recharging time after assembling a car in a train.

This object is accomplished by providing a release valve which can be actuated by the brakeman to release the pressure in the brake cylinder while maintaining the pressure in the reservoirs. By placing this valve in the line between the AB valve and the brake cylinder, it will not affect the operation of the AB valve in any manner. The valve is further designed to have a safety cut-off feature that will not allow the brakes to be released when the brake pipe pressure is above a predetermined pressure, thereby assuring that the cars are not moved until the brake pipe line has been disconnected from the engine.

Another object is to provide an overtravel linkage in a brake cylinder release valve to allow for bleeding of the air reservoirs in the event that the reservoirs are overcharged or that the brakes have become locked. This object is accomplished by connecting the actuating rod for the brake cylinder release valve to the duplex valve and actuating the duplex valve (normally found on the AB valve) in the overtravel motion allowed for in the brake cylinder release valve. It is possible with this arrangement to selectively bleed the reservoirs on the AB valve and to reset the brake cylinder release valve whenever the pressure in the reservoirs falls below the brake pipe pressure.

Other objects and advantages will be pointed out in, or be apparent from, the specification and claims, as will obvious modifications of the single embodiment shown in the drawings, in which:

FIG. 4 is a side elevation of a duplex valve;

FIG. 5 is a sectional view of a modified differential piston;

FIG. 6 is a sectional view of an external overtravel arrangement;

Figure 1:
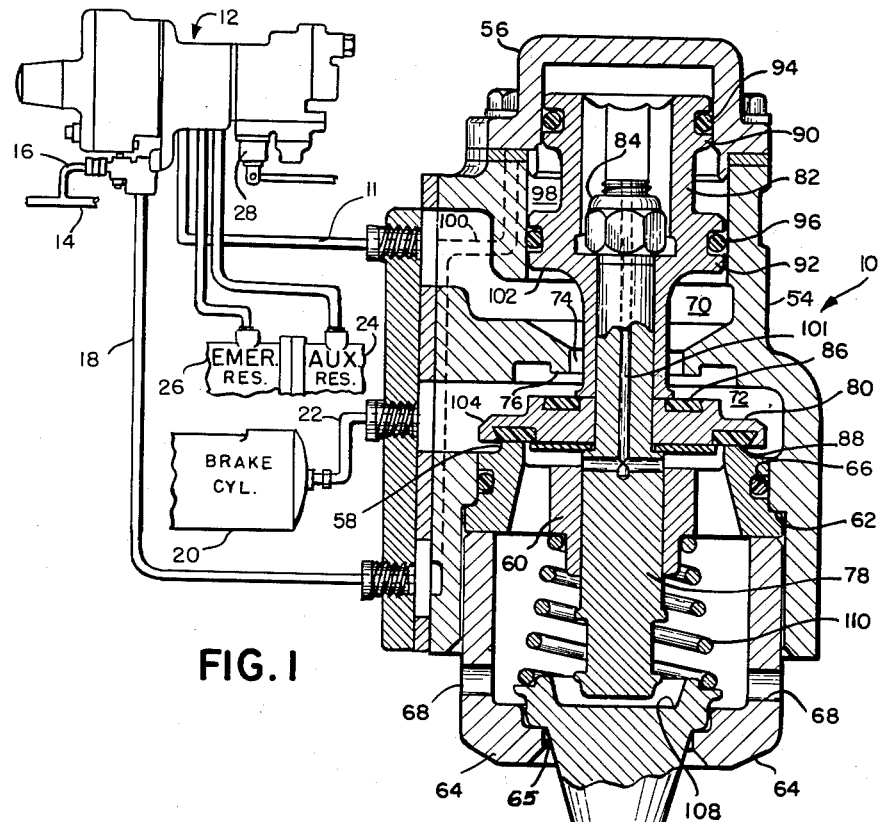
FIG. 1 is a side elevation in section showing the brake cylinder release valve connected to an AB valve.

Referring to the drawings, a brake cylinder release valve 10 is shown connected to pressure line 11 of an AB valve 12 with a brake pipe pressure line 14 connected to the AB valve by line 16 and to the release valve by line 18. Brake cylinder 20 is connected to the release valve by line 22 and is operated by dropping the pressure in the brake pipe line allowing the auxiliary reservoir 24 or the auxiliary reservoir and the emergency reservoir 26 to pressurize the brake cylinder. The operation of AB valves is well known and requires no further explanation.

Figure 3:
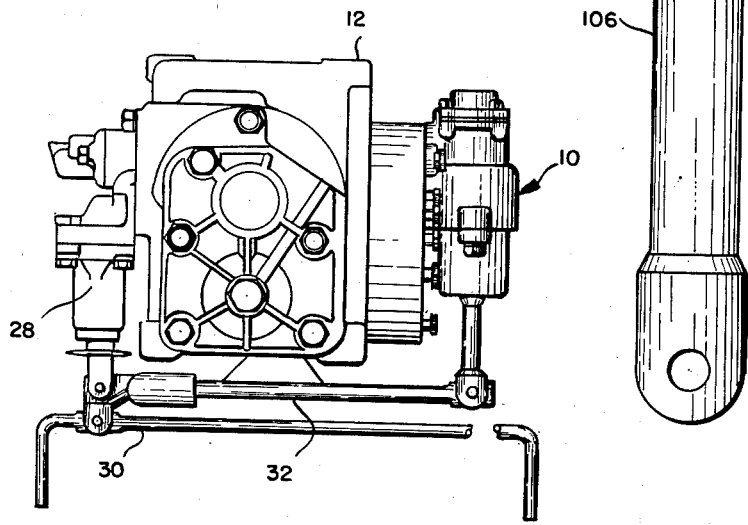
FIG. 3 is a view of the brake cylinder release valve connected to the duplex valve on an AB valve.

A duplex release valve 28 (FIG. 4) is also shown mounted on the side of the AB valve 12 (FIG. 3) directly opposite the brake cylinder release valve and is connected to the brake cylinder release valve by a double hand 30, a two way spring hereinafter described (FIG. 4), and a link 32. Pushing or pulling on the handle will rock actuator 34 in end cap 36, moving valve lifter 38 upward against the bias of spring 40. The valve lifter is provided with pins 42 and 44 which push valves 46 and 48 upward against the bias of springs 50. Air released by lifting of the valves is vented to atmosphere through aperture 52 in the actuator. Pin 42 is longer than pin 44 so that valve 46 for the auxiliary reservoir is lifted before valve 48 for the emergency reservoir. The motion of the handle required to lift valve 48 after valve 46 has been lifted is used to "set" the brake cylinder release valve to release the pressure from the brake cylinder. It can be seen that with this arrangement it is possible to release the pressure in the auxiliary reservoir before the brake cylinder release valve is "set" and to release the pressure in the emergency reservoir only after the brake cylinder release valve has been "set."

Where independent operation is desired, a release valve 10 of the type shown in FIG. 1 is used. This valve 10 includes a housing 54 closed at one end by a cylindrical cap 56 and at the other end by a valve seat 58 supporting an axially extending guide cylinder 60 and held against a flange 62 in the housing by an end cap 64 secured in the lower open end of the housing and having a central opening 65. The valve seat is sealed by O-ring 66 and is vented to atmosphere through ports 68 provided in the end cap. The central portion of the housing is divided into an upper chamber 70 and a lower chamber 72 by a passage 74 having a valve seat 76. The upper chamber is connected to the AB valve by line 11 and the lower chamber is connected to the brake cylinder by line 22 so that any air from the AB valve must pass through passage 74 before reaching the brake cylinder.

A valve stem 78 is positioned to slide within guide cylinder 60 in the housing and extends upward through passage 74 into cylindrical cap 56. A valve member 80 and differential piston 82 are mounted on the stem and held thereon by nut 84. The valve member is movable between valve seats 58 and 76 and is provided with valve seals 86 and 88 to close passage 74 when the valve member engages valve seat 76 and to close the passage to atmosphere when the valve member is moved against valve seat 58. The differential piston is provided with a small piston 90 slidable in the cylindrical cap and a large piston 92 slidable in the bore of the housing. The pistons are sealed by O-rings 94 and 96, respectively, to form a differential pressure area 98 between the pistons which is connected to the brake pipe pressure line by passage 100. The cylindrical cap is vented to atmosphere through passage 101 in the valve stem so that the air trapped in the cylindrical cap will not interfere with the motion of the piston.

Brake pipe pressure is admitted to the differential area of the differential piston through passage 100. Because of the difference in the areas of the pistons, the brake pipe pressure will cause the differential piston to move downward until the valve member is seated on valve seat 58. The AB valve is now in communication with the brake cylinder through passage 74. When the brake cylinder is pressurized, the air pressure in chamber 70 will act on the lower surface 102 of the large piston and on the upper surface 104 of the valve seat member. Since the valve member has a larger surface area than the lower surface of the piston, the differential force between these two surfaces will be downward and a reduction in brake pipe pressure will not adversely affect the position of the differential piston.

The air pressure in the brake cylinder is released by rocking actuator 106 in end cap 64 in any direction so that cam surface 108 engages the lower end of the stem, pushing the piston and valve member upward. Valve seal 86 will seat on valve seat 76 closing passage 74 and valve seal 88 will disengage from seat 58 allowing the air in the brake cylinder to escape to atmosphere through ports 68. Since the brake pipe pressure is normally reduced when the brake pipe pressure lines are opened to uncouple the cars, the differential piston will be held in the upper position by the pressure trapped in the upper chamber acting on the lower surface of the large piston. If the brake pipe line has not been properly uncoupled from the train or if the brake pipe pressure is above the upper chamber pressure by a predetermined limit, the piston will move downward when the handle is released since the differential force between the two pistons will be greater than the force of the air in the upper chamber on the lower surface of the piston. Passage 74 will be opened and the brake cylinder will be pressurized. Spring 110 seated on guide cylinder 60 will return the handle to a neutral position after the valve has seen "set" in the brake cylinder pressure release position. It can be seen that the movement of the valve member and differential piston can be made practically instantaneously so that the loss of pressure from one or both reservoirs will be at a minimum.

In FIG. 5 a modified differential piston arrangement is shown in which the large piston 91 is provided with two O-rings 93 and 95 which slide within the bore of the housing. An exhaust passage 97 connects the area between these O-rings to passage 99 in the valve stem. If O-ring 93 should become damaged and rupture, the brake pipe pressure in differential area 103 will be vented to atmosphere thus preventing the possibility of the brake pipe pressure from leaking into chamber 71 and pressurizing the brake cylinder.

Figure 2:
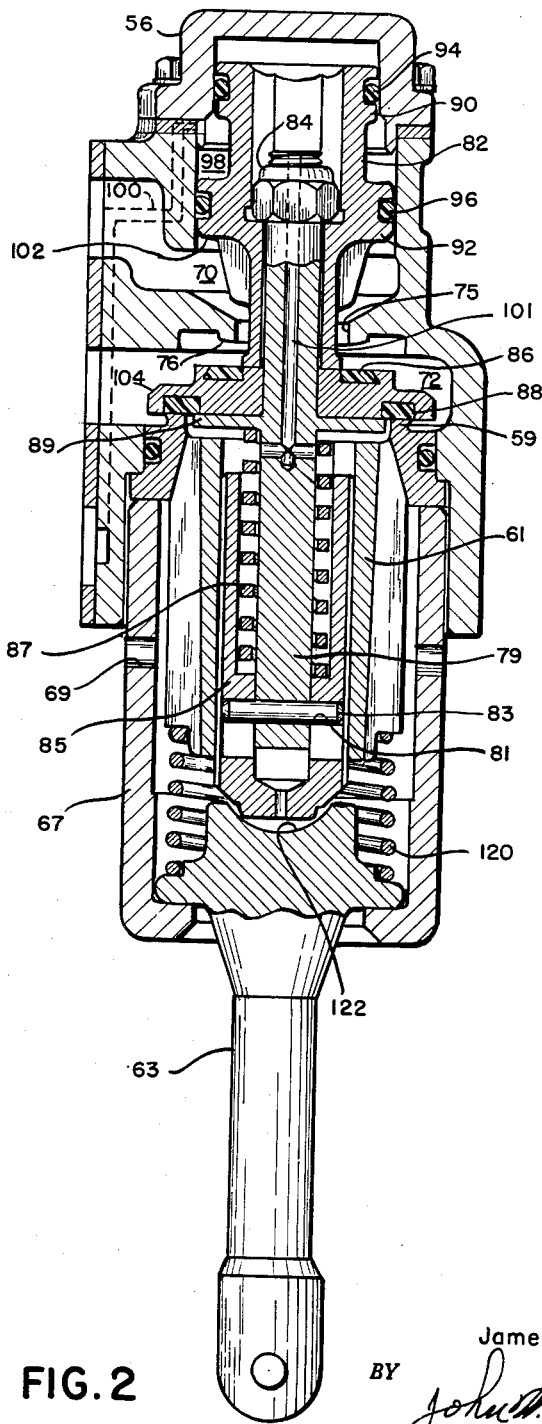
FIG. 2 is a side elevation of the valve with an overtravel system.

In FIG. 2 a modified brake cylinder release valve is shown which has an overtravel arrangement in the actuator and is used in combination with the duplex valve (FIG. 4) to control both the duplex valve and the brake cylinder release valve by the actuation of a single handle. The same basic structure as shown in FIG. 1 is used for the piston and valve member with a modified valve seat 59 supporting an elongated guide cylinder 61. The valve stem 79 extends through the guide cylinder and has an aperture 81 to hold pin 83. The end cap 67 is enlarged to enclose the valve stem and is secured in the housing to hold the valve seat in position. A sleeve 85 is slidably mounted on the stem and retained thereon by pin 83 and is slidable within the guide cylinder 61. Spring 87 is positioned on the stem between the sleeve and flange 89. When handle 63 is initially rocked in the end cap against the bias of spring 120 seated on the guide cylinder 61, contoured surface 122 will initially rotate about the lower end of the stem before engaging the stem allowing a small amount of free motion in the actuator. This motion is used to unseat the auxiliary valve in the duplex valve. Continued motion of the actuator will bring the contoured surface of the actuator into contact with the lower end of the stem. Spring 87 has a spring force substantially greater than that of spring 120 so that the sleeve and stem move as a unit pushing the valve member against valve seat 59. The initial motion of the handle is used to relieve the pressure in the auxiliary reservoir as described above before there is any motion of the stem. The continued motion of the handle after engaging the sleeve will close passage 75 and vent the brake cylinder to atmosphere through ports 69. After the valve member has closed passage 75, the pressure in the emergency reservoir can be released by pulling the actuator until sleeve 85 slides upward on the stem. Since spring 87 has a compressive force considerably greater than spring 120, a greater amount of effort is required to release the pressure from the emergency reservoir than from the auxiliary reservoir. This is to prevent unnecessary bleeding of the emergency reservoir.

The action of the valve has been described in a step-by-step manner, but in practice the valve member can be moved in one quick motion to release the pressure of the brake cylinder with a very small loss of pressure in the reservoirs. Once the valve member has been set in the brake cylinder release position, it is normally reset when brake pipe pressure is restored in the line. To reset the valve without restoring full brake pipe pressure, the handle is moved only far enough to relieve the pressure of the auxiliary reservoir until the pressure in chamber 70 is approximately two pounds per square inch below the brake pipe pressure in pressure area 98. Setting and resetting of the valve can be repeated only as many times as there is a pressure difference between chamber 70 and the differential pressure area.

Figure 7:
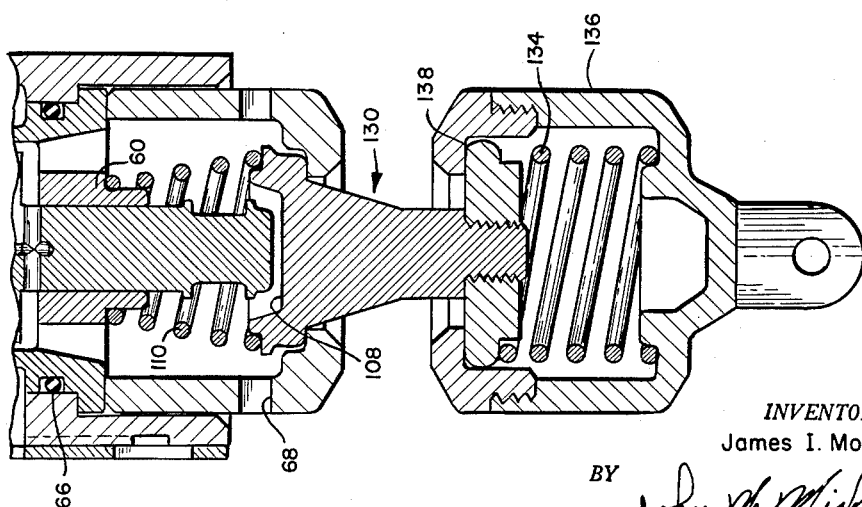
FIG. 7 is a sectional view of another modified external overtravel arrangement.

In FIGS. 6, 7, 8 and 9 modified actuators for the brake cylinder release valves of FIGS. 1 and 2 are shown which use the same basic structure as shown in FIG. 1, but modify the actuator to provide the overtravel spring action. FIG. 6 shows a valve actuator 130 having a stiff coil spring 132 between the end and head of the actuator to allow freedom of motion after the valve has been "set." FIG. 7 shows a compression spring 134 seated within housing 136 and acting against flange 138 threaded onto the end of the actuator. After the brake cylinder release valve has been set, overtravel motion is provided by compression spring 134. It can be seen that in all of these arrangements, the overtravel motion of the actuator is absorbed by a stiff spring located externally to the brake cylinder release valve housing.

Figure 9:
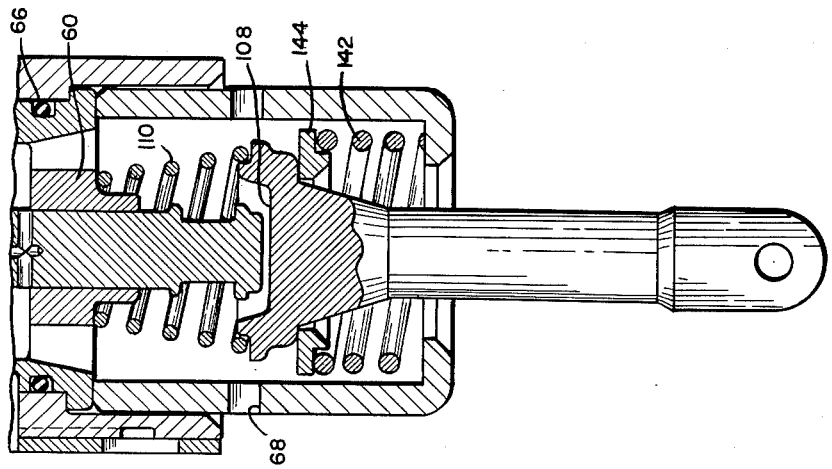
FIG. 9 is another modification of the internal overtravel arrangement.
Figure 8:
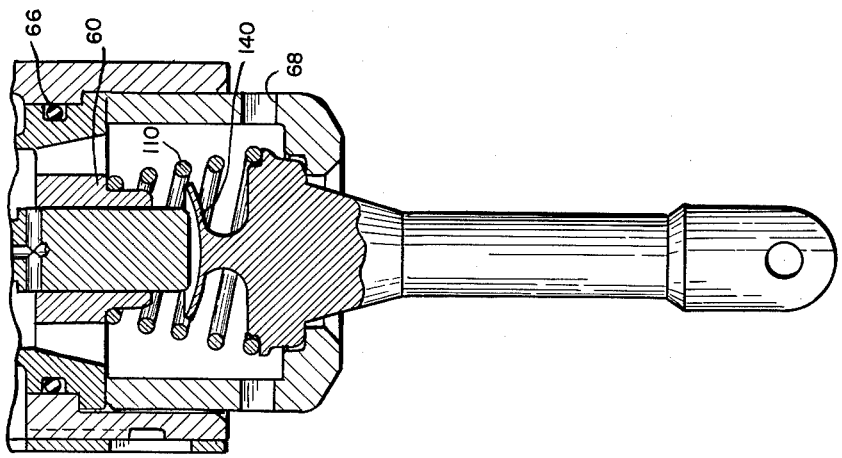
FIG. 8 is a sectional view of the overtravel arrangement with an internal spring.

In FIGS. 8 and 9 the overtravel spring is internal to the housing as in FIG. 2. In FIG. 8 the actuator is manufactured with a dish type cantilever spring 140 integral with the head of the actuator which will bend after the valve member has been "set" allowing the actuator to be moved far enough to open the emergency valve in the duplex valve. In FIG. 9 spring 142 is seated in annular ring 144 provided below the head of the actuator. On movement of the handle in any direction, spring 142 will act as a solid until the stem has moved the valve member into engagement with the valve seat. Any motion of the actuator after the valve member has been "set" will be absorbed by the stiff compression spring.

A two-way spring 150 may also be provided in link 32 as shown in FIG. 4 to absorb the overtravel motion of the handle after the valve member has been set. Link 32 is provided with a flange 152 which engages the spring midway between its ends allowing the handle to be either pushed or pulled to actuate the valves.

Although but a single embodiment of the present invention has been illustrated and described, it will be apparent to those skilled in the art that various changes and modifications may be made therein without departing from the spirit of the invention or from the scope of the appended claims.

I claim:

1. A control valve for a railroad air brake system having a brake pipe pressure line, an air reservoir pressure system and an air pressure actuated brake cylinder, said control valve comprising, a housing having a reservoir inlet passage, a brake pipe pressure inlet passage, a brake cylinder outlet passage, and an exhaust passage, a valve passage connecting said reservoir inlet passage to said exhaust and brake cylinder passages, a valve member mounted in the housing for movement in one direction to connect said reservoir passage with said brake cylinder passage and movable in the opposite direction to connect said brake cylinder passage to said exhaust passage, piston means operatively connected to the valve member and responsive to the pressure in said brake pipe passage to urge said valve member in the one direction, universally movable means for moving the valve member and piston means in the opposite direction to vent the brake cylinder passage to said exhaust passage and to close the reservoir passage, said valve member being held in reservoir passage closing direction by the pressure in said reservoir inlet passage acting on the piston means, means for relieving the pressure in the reservoir inlet passage, and means inter-connecting the universally movable means and the relieving means whereby the initial motion of the movable means will relieve the pressure in the reservoir inlet passage.

2. A control valve according to claim 1 whereby said universally movable means includes a first spring means for allowing free motion of the universally movable means before the valve member is moved to the reservoir passage closing position and a second spring means for allowing motion after the valve member is moved to the reservoir passage closing position.

3. A control valve according to claim 2 wherein said second spring means is located within the housing.

4. A control valve according to claim 2 wherein said second spring means forms a part of the universally movable means.

5. A control valve according to claim 2 wherein said second spring means forms a part of the means interconnecting the universally movable means and the relieving means.

6. The combination with a railroad air brake system having a brake pipe pressure line, an air pressure reservoir system including a duplex valve for separately relieving the pressure in the reservoir system, and a brake cylinder, of means for coordinating the operation of the duplex valve and the releasing of pressure from the brake cylinder comprising, a control valve having an air passage connecting the reservoir system to the brake cylinder and an exhaust passage connected to the air passage, means for controlling flow through the air passage and exhaust passage, said controlling means including a differential piston means responsive to pressure in the brake pipe pressure line to open the air passage and close the exhaust passage, said piston means including two piston heads of different cross-sectional area spaced apart to define a differential pressure area for the brake pipe pressure which provides a force in the air-passage-opening position, universally movable means for moving the controlling means to close the air passage and open the exhaust passage thereby relieving pressure from the brake cylinder, said universally movable means being connected to the duplex valve, said movable means including an overtravel means for actuating the duplex valve before the controlling means is moved to the air-passage-closing position to relieve the pressure as desired in part of the reservoir system and after the controlling means is moved to the air-passage-closing position to relieve the pressure as desired in the other part of the reservoir system.

7. The combination according to claim 6 wherein the universally movable means includes a handle having a head portion operatively engaging the controlling means and being biased by a first spring to a neutral position.

8. The combination according to claim 7 wherein the overtravel means includes a second spring forming the handle for the universally movable means.

9. The combination according to claim 7 wherein the overtravel means includes a second compression spring and a sleeve positioned between the handle and the controlling means to allow the handle to be moved after the controlling means has been moved to the air-passage-closing position.

10. The combination according to claim 7 wherein the overtravel means comprises a second compression spring in the connection between the handle and duplex valve so that the connection can be moved after the controlling means is moved to the passage-closing position.

11. A control for a railroad air brake system having a brake pipe pressure line, an air reservoir pressure system and an air pressure actuated brake cylinder, said control comprising, a housing having a first pressure chamber adapted to be connected to the brake pipe pressure line, a second pressure chamber adapted to be connected to the air reservoir pressure system, and a third pressure chamber adapted to be connected to the brake cylinder and having an exhaust passage connected thereto, piston means separating the first chamber from the second chamber, valve means connecting the second chamber to the third chamber stopping flow from the second chamber to the third chamber in one position and stopping flow from the third chamber to the exhaust passage in the other position, stem means connecting the piston means to the valve means, said stem means being provided with a passage connecting the first chamber to the exhaust passage, said piston means including a small area piston and a large area piston spaced apart and connected to define a pressure differential area responsive to the pressure in the brake pipe pressure line, said piston means including seal means to prevent the air under pressure in the differential area from leaking into the second chamber and into the exhaust passage, said differential area providing a force on the valve means to stop flow from the third chamber to the exhaust passage whenever there is pressure in the differential area, universally movable means for moving the valve means and the piston means to the one position thereby opening the exhaust passage and relieving the pressure in the third chamber, said piston means and valve means remaining in the one position after the movable means is released due to the pressure in the second chamber.

12. A control valve according to claim 11 wherein the seal means for the large piston comprises a pair of O-rings spaced apart and the large piston includes a passage connecting the space between the O-rings to the stem passage whereby a rupture of one of the O-rings will vent the differential area or the second chamber to atmosphere.

13. The combination with a railroad air brake system having a brake pipe pressure line, an air pressure reservoir system including a duplex valve for separately relieving the pressure in the reservoir system, and a brake cylinder, of means for coordinating the operation of the duplex valve and the releasing of pressure from the brake cylinder comprising, a control valve having an air passage connecting the reservoir system to the brake cylinder and an exhaust passage connected to the air passage, means for controlling flow through the air passage and exhaust passage, movable means for moving the controlling means to close the air passage and open the exhaust passage thereby relieving pressure from the brake cylinder, said movable means being connected to the duplex valve, said movable means including an overtravel means for actuating the duplex valve before the controlling means is moved to the air-passage-closing position to relieve the pressure as desired in part of the reservoir system and after the controlling means is moved to the air-passage-closing position to relieve the pressure as desired in the other part of the reservoir system.

14. The combination according to claim 13 wherein the universally movable means includes a handle having a head portion operatively engaging the controlling means and being biased by a first spring to a neutral position.

15. The combination according to claim 14 wherein the overtravel means includes a second spring forming the handle for the universally movable means.

16. The combination according to claim 14 wherein the overtravel means includes a second compression spring and a sleeve positioned between the handle and the controlling means to allow the handle to be moved after the controlling means has been moved to the air passage closing position.

17. The combination according to claim 14 wherein the overtravel means comprises a second compression spring in the connection between the handle and duplex valve so that the connection can be moved after the controlling means is moved to the passage closing position.

References Cited in the file of this patent

UNITED STATES PATENTS

| | | |
|---|---|---|
| 2,735,726 | Klingler et al. | Feb. 21, 1956 |
| 2,886,377 | Martin | May 12, 1959 |